Dec. 15, 1964 T. M. BERRY 3,161,544

RECORDING AND PORTRAYING APPARATUS

Original Filed April 27, 1951 2 Sheets-Sheet 1

Inventor:
Theodore M. Berry,
by Paul A. Frank
His Attorney.

Dec. 15, 1964 T. M. BERRY 3,161,544

RECORDING AND PORTRAYING APPARATUS

Original Filed April 27, 1951 2 Sheets-Sheet 2

Inventor:
Theodore M. Berry
by Paul A. Frank
His Attorney.

United States Patent Office 3,161,544
Patented Dec. 15, 1964

3,161,544
RECORDING AND PORTRAYING APPARATUS

Theodore M. Berry, deceased, late of Schenectady, N.Y., by Albert L. Berry, administrator, Jewell, Kans., assignor to General Electric Company, a corporation of New York Continuation of application Ser. No. 223,423, Apr. 27, 1951. This application June 14, 1960, Ser. No. 36,097
28 Claims. (Cl. 118—637)

Figure 1:
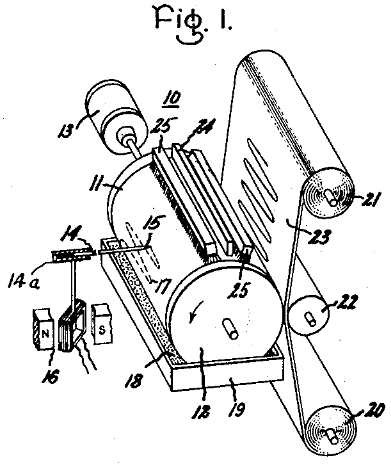

The invention relates to recording and portraying methods and apparatus, and more particularly to methods and apparatus for pictorially writing, recording, storing, and printing information. A principal object of the invention is to provide a new type of magnetic information recording and portraying process and apparatus which overcomes many of the difficulties inherent in conventional type recording and portraying systems. This application is a continuation of application No. 223,423, filed April 27, 1951, assigned to the present assignee, and now abandoned.

One problem of long standing in the field of recording and portraying apparatus is that of producing a simple recorder not of the ink-flow type which accurately records and immediately portrays a signal supplied to the recorder. Ink-flow type apparatus inherently requires periodic attention, and it is quite difficult to regulate the rate of ink-flow so that clear delineation of all types of signals is produced. Optical-type recorders employing light as the recording medium, normally necessitate subsequent dark room developing of the film record. Other special types of recorders, such as recorders known as "spark recorders" which employ an electric current impulse to mark an electro-sensitive material, all usually require specially treated recording materials or complicated developing processes.

Accordingly, another object of the invention is to provide a non-ink-flow recording and portraying apparatus which employs easily available materials and a simple, open and immediate developing process.

Another problem is that of providing apparatus capable of recording and portraying information at very high speed. Apparatus for transmitting or compiling information, such as those employing electric currents or electromagnetic or compressional waves, have now been perfected to an extent such that virtually thousands of items of information can be made available during a very short interval of time, such as a fraction of a second. Apparatus presently devised for the purpose of recording and portraying such transmitted or compiled information is not, however, adapted to such high speed operation. As a consequence, high speed information transmitting or compiling apparatus such as high speed telemeters or high speed computers often must stand idle until information which they have quickly made available is eventually transformed into a usable recorded or portrayed form. For example, the highest speed mechanical printers now generally available can print in the neighborhood of three lines of characters per second. Modern digital computers, however, can supply information at a much higher rate of speed such that printers capable of printing in the neighborhood of several hundred lines per second are sorely needed for use in conjunction with such digital computers.

Accordingly, an additional object of the invention is to provide a new method and apparatus for recording and portraying information which is amenable to operation at a much higher rate of speed than is now generally obtainable.

In fulfillment of this latter object, one specific object of the invention is to provide new methods and apparatus for high speed production of magnetic images of pictorially portrayable information; and another specific object of the invention is to provide a recording and portraying apparatus capable of printing as high as several hundred lines of information per second.

As used in this specification, the term "magnetic image" means localized magnetic fields produced in a material of high magnetic retentivity, the localized fields having an invisible configuration or flux pattern within the magnetic material corresponding to the visible configuration of subject matter or information ultimately desired to be portrayed or recorded.

Still another feature, highly to be desired but usually lacking in recording apparatus, is an ability to store the recorded information so that many copies of the originally recorded information may be made.

A further object of the invention, therefore, is to provide a non-optical and non-ink flow recording apparatus in which the received information is recorded in a form that enables the direct and immediate production of innumerable copies.

A still further object of the invention is to provide new methods and apparatus for fulfilling many and widely differing information recording and portraying functions such as exemplified by graphic recorders and facsimile printers, as well as type-setting and character printing equipment.

In general, the invention comprises the formation of a "magnetic image" in the form of localized magnetic fields in a high retentivity magnetic material, the configuration of the invisible localized fields or flux patterns being a pictorial representation of the object or information desired ultimately to be transformed into a visible or otherwise usable form. The magnetic image is "developed" by bringing minute magnetic particles into the magnetic attracting influence of the material containing the impressed magnetic image with the result that the particles adhere to the material in the form and outline of the image. The particles magnetically retained by the image may then be utilized to produce printed records.

Figure 3:
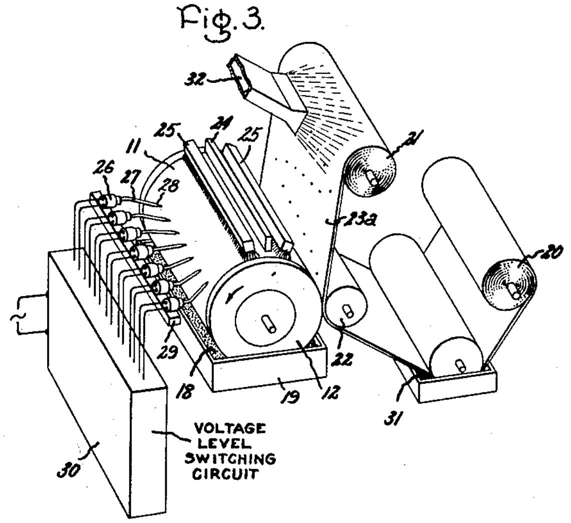
Figures 2, 4:
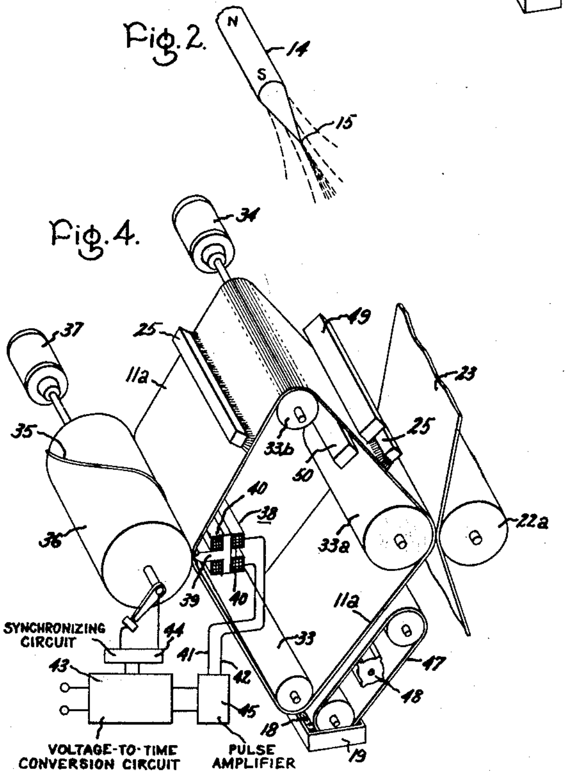
Figure 5:
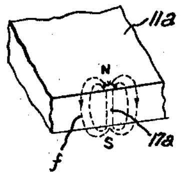
Figure 6:
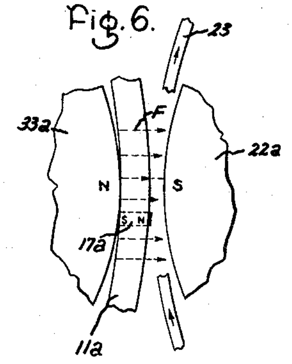
Figure 7:
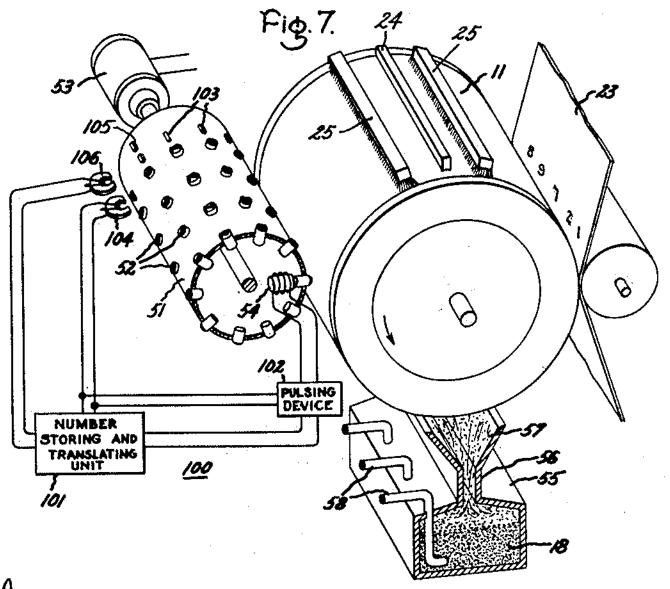
Figures 8, 9, 10:
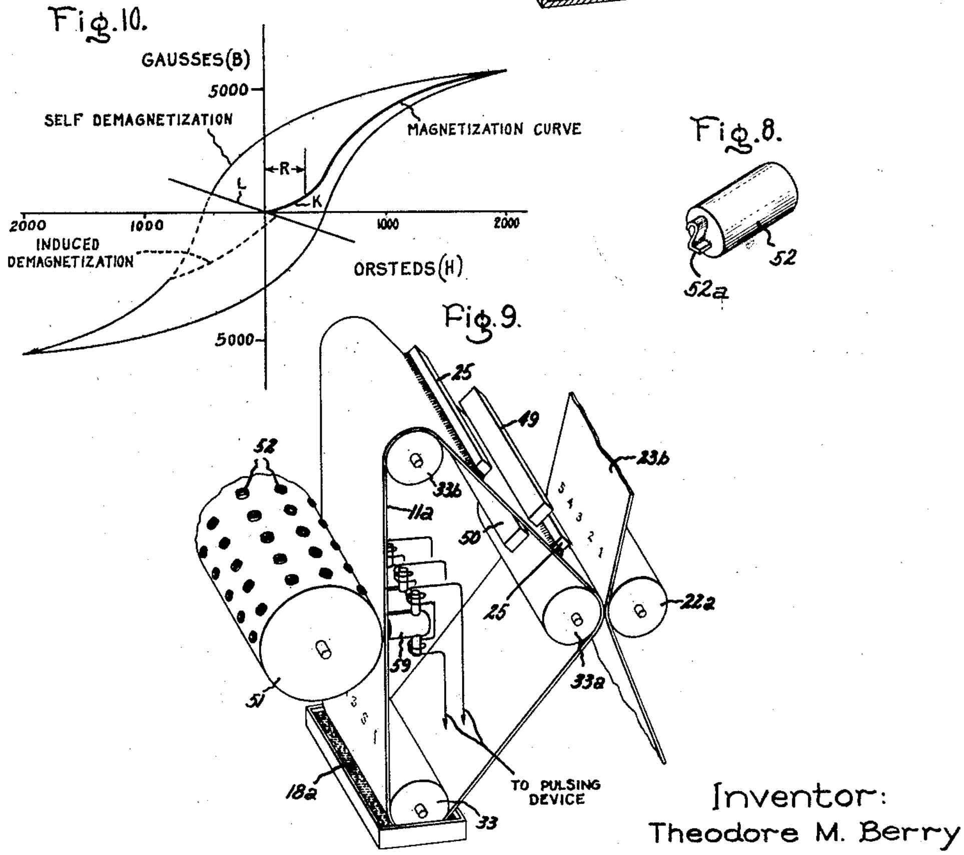

The novel features which are believed to be characteristic of the invention are set forth with particularly in the appended claims. The invention itself, however, together with further objects and advantages thereof can best be understood by reference to the following description taken in connection with the accompanying drawing in which FIG. 1 is a perspective view of a simple graphic recorder embodying the invention; FIG. 2 is an enlarged view of an end portion of a magnetizing member employed with apparatus of FIG. 1 and illustrating a magnetic field configuration produced thereby; FIG. 3 is a perspective diagrammatic view of a graphic recorder embodying the invention and adapted to high speed recording and pictorial portrayal of an electric signal; FIG. 4 is a similar view of a facsimile printer embodying the invention; FIG. 5 is an enlarged sectional view of a magnetized portion of a ferromagnetic member employed in the apparatus of FIG. 4; FIG. 6 is a sectional view of a magnetic field producing printing means employed in the apparatus of FIG. 4; FIG. 7 is a perspective diagrammatic view of a high speed character printing apparatus embodying the invention; FIG. 8 is an enlarged perspective view of a character plug employed in the apparatus of FIG. 7; FIG. 9 is a diagrammatic perspective view of a modification of the character printing apparatus of FIG. 7 including certain refinements thereof; and FIG. 10 illustrates a typical magnetization curve of the ferromagnetic image retaining member employed in apparatus embodying the invention. In the drawings, similar elements are designated by the same reference numeral, while modifications of similar elements generally are designated by the same reference numeral followed by a distinguishing letter.

Referring now to FIG. 1, the invention is shown embodied in a simple graphic recorder 10 comprising, in general, a revolving smooth surface ferromagnetic cylinder 11 preferably of high magnetic retentivity upon which a "magnetic image" is impressed by a suitable magnetizing member 14, a magnetic image developing material 18 arranged to be attracted by this impressed magnetic image into contact with ferromagnetic cylinder 11, and means for bringing a web 23 of print receiving material into printing relation with the image developing material adhering to the magnetic image containing surface of ferromagnetic member 11.

The word "ferromagnetic" is herein employed to define a substance whose magnetic permeability is considerably above that of air and varies at different values of flux density. Ferromagnetic materials have the very marked magnetic effects exhibited, for example, by iron, nickel and cobalt. The expression "magnetic retentivity" herein employed defines the ability of a magnetic material to retain its magnetization once it is magnetized. More technically, ferromagnetic materials have high "magnetic retentivity" in the sense used above when the material has high coercivity, preferably above 100 oersteds, and a high external maximum energy product; the "coercivity" being the magnetic force which must be applied in a reverse direction to a magnetized body to remove its residual magnetism, and the maximum energy product being the maximum product of the flux density and the coercive force occurring under any magnetized condition of the material. As mentioned previously, the term "magnetic image" is herein employed to define a region of localized magnetization in a ferromagnetic member. The word "image" is particularly apt because the configuration of the magnetizing field determines the configuration of the resultant localized magnetization of the ferromagnetic member, which magnetization may thus be appropriately described as a magnetic reproduction or "image" of the magnetizing field.

Referring in more detail to graphic recorder 10, a locally or "permanently" magnetizable ferromagnetic member, such as the cylinder 11 of high magnetic retentivity, is carried on a suitable support, such as a magnetically permeable drum 12, and revolved at a constant speed by such means as motor 13. A magnetic field producing means, which may conveniently be in the form of a magnetizing member 14 such as a permanent magnet stylus, is arranged with the stylus tip 15 in magnetizing relation, such as contiguous to the surface of ferromagnetic cylinder 11. Drum 12 preferably comprises a highly permeable magnetic material such as soft iron in order to direct the magnetic flux from stylus 14 to penetrate completely through permanently magnetizable cylinder 11. Means such as galvanometer 16 is provided for moving the stylus tip 15 axially under the tension of spring loaded sleeve 14*a* along the surface of cylinder 11 in accord with the amplitude of an electric signal supplied to galvanometer 16. The movement of stylus 14 functions to delineate a locally magnetized invisible line on the surface of ferromagnetic cylinder 11, which line comprises a type of "magnetic image" as indicated by dotted line 17.

The magnetic field producing means, such as represented by magnetizing member 14 in FIG. 1, should be one that provides a high concentration of magnetic flux through the locally magnetizable member 11 in the shape of the elemental image that is to be formed by the magnetic field. If a line magnetic image is desired, magnetizing member 14 should have a sharpened and tapered edge on tip 15 making substantially punctiform contact with the surface of the locally magnetizable member 11. A preferred tip configuration for such a magnetic line image producing magnetizing member 14 is shown in FIG. 2, and the resulting flux pattern illustrated by dashed lines emanating from tip 15. Any highly and permanently magnetizable material, such as an alloy of aluminum, nickel, and cobalt of the type known as Alnico, is suitable for such a permanently magnetized member 14.

Maintained in close proximity or contact with the surface of cylinder 11 in a position to come under the magnetic attracting influence of the magnetic image 17 as cylinder 11 revolves is a magnetic image developing material 18, which may conveniently comprise comminuted magnetic material such as pulverized iron filings or minute iron oxide particles. Image developing material 18 may be kept or propelled in proximity with or in contact with the surface of cylinder 11 by any suitable means such as an open container 19. Image developing material 18 may be either in a dry powder form or suspended in a fluid.

As the portion of ferromagnetic cylinder 11 containing magnetic image 17 passes in contact with or in the vicinity of the comminuted magnetic material 18, particles of material 18 are attracted to the locally magnetized surface of cylinder 11 and arrange themselves to assume the form and outline of the magnetic image 17 impressed thereon. As the rotating cylinder 11 emerges from the comminuted material 18, a visible line of magnetic particles corresponding to the magnetic image formed by the moving stylus 14 continues to adhere to the magnetized image on the surface of cylinder 11, and a "development" of the magnetic image 17 is thus produced.

This visible line of magnetic particles adhering to the surface of ferromagnetic cylinder 11 may for some purposes comprise a sufficient portrayal of the information to be recorded. However, for most practical purposes, portrayal upon a separate portable sheet of print receiving material, such as some form of paper, is to be preferred. Accordingly, in FIG. 1, there is shown means such as a supply roller 20, a take-up roller 21 and a transfer roller 22, for feeding an interposed sheet or web 23 of print receiving material in axially extending surface contact with the permanently magnetizable cylinder 11 after it emerges from the magnetic image developing influence of comminuted magnetic material 18.

Several different contact printing techniques and apparatus may be employed for accomplishing the actual transfer of the magnetic image adhering particles to the print receiving web 23. One convenient printing system shown in FIG. 1 utilizes a print receiving member 23 comprising a web coated with a suitable size of any well-known glutinous material. Some of the magnetic particles 18 adhering to magnetic image 17 stick to sized web 23 and are pulled away from the magnetically attracting surface of cylinder 11 with the result that a record of image 17 is printed upon the sized material 23. Alternatively, the comminuted magnetic material itself may be coated with a suitable adhesive or cementitious material which causes some of the magnetic particles to adhere, upon contact, to a print receiving member 23 which may in that case simply comprise an untreated sheet of paper. The adhesive coating employed for the comminuted magnetic material should preferably be one that exerts less adhesion to the polished surface of ferromagnetic member 11 than to the print receiving member 23. An adhesive coating solution of rosin dissolved in alcohol has been found to be quite suitable for this purpose. Other methods and apparatus for accomplishing the actual transfer of magnetic particles to the print receiving web 23 are described hereinafter in connection with other figures.

In order to enable a continuous pictorial portrayal or printing of the incoming information, means are provided for demagnetizing or "erasing" the magnetic image 17 produced by stylus 14 after the image has been developed and printed in the manner described above. A magnetization erasing member 24 may conveniently be an axially extending bar magnet, as shown, having a magnetic polarity relative to cylinder 11 opposite to that of the magnetic stylus. The strength of bar magnet 24 should be great enough to remove the magnetic images impressed on cylinder 11 but not so great as to magnetize cylinder 11 in an opposite direction. Since cylinder 11 is composed of ferromagnetic material having high coercivity, it requires a strong magnetizing force either to magnetize or to demagnetize the material. In FIG. 10, there is shown a typical magnetization curve for high coercivity ferromagnetic material. As can be seen from this curve, expressed in terms of magnetizing force in oersteds (H) and flux density in gausses (B), there is an initial low permeability region "R" of the curve over which the small magnetizing forces involved have relatively little magnetizing effect. With magnetizing forces increasing beyond the limits of the forces represented by region R, the flux density rises rapidly to saturation and a permanent magnetization of cylinder 11 results. After the magnetizing field is removed, the magnetized portion of cylinder 11 sets up its own field in a direction opposite to the previonus magnetizing field. Since cylinder 11 is preferably fairly thin, this cylinder field produces a partial self-demagnetization such that only a relatively low level of permanent magnetization along a locus represented by the line L is induced in cylinder 11. Consequently, an oppositely directed demagnetizing force considerably less than the initial magnetizing force provided by magnetizing member 14 is required to return cylinder 11 to a substantially unmagnetized condition and no appreciable magnetization of cylinder 11 in an opposite direction results. A typical induced demagnetization path for cylinder 11 is illustrated by the dashed curve of FIG. 10. For complete demagnetization, a series of magnets of decreasing strength and of alternatingly opposite polarity may be arranged side by side in place of the single magnet 24, in a manner well known to the magnetic recording art.

In order to remove completely any magnetic particles which formerly adhered to the erased magnetic image, cleaning members 25 are also provided, preferably located on both sides of bar magnet 24 although one cleaning member located between the contact printing line and magnet 24 may be sufficient. Cleaning members 25 may be axially contacting brushes, as shown, or may be wetted cloths or vacuum cleaning systems.

If copies of the information recorded as a magnetic image on the cylinder 11 are desired, it is necessary only to remove the influence of erasing member 24, cleaning member 25 and recording stylus 14 after the desired image has been produced. The rotating cylinder 11 will thereupon continue to print the information recorded on cylinder 11 with each revolution thereof.

Referring now to FIG. 3, there is shown an embodiment of the invention whereby a high frequency electric signal may be recorded and portrayed. In FIG. 3 a plurality of electromagnets are arranged in the form of a linear array exially extending adjacent the surface of a permanently magnetizable cylinder 11. Electromagnets 26 each have a core member 27 having a magnetizing tip 28 arranged in mutual linearly spaced magnetizing proximity or contact with the surface of ferromagnetic cylinder 11. The entire array is supported by a non-magnetic bar 29. Each electromagnet 26 is arranged to be energized as a separate channel of a voltage level switching circuit, designated as block 30. Voltage level switching circuit 30 functions to select and energize a predetermined one of electromagnets 26 in accord with a particular amplitude level of an incoming voltage signal. Such voltage level switching circuits are well known and may comprise, for example, a cathode ray electron discharge device and circuit such as described in U.S. Patent 2,291,476, granted October 8, 1941, to C. E. Kernkamp, wherein a plurality of laterally spaced target anodes are selectively energized by the displacement of an electron beam in response to the amplitude of a signal voltage supplied to the deflection plates of the discharge device. Another voltage level switching circuit particularly well adapted for the purpose is disclosed in U.S. patent application Serial No. 118,532, filed September 29, 1949, by S. E. Gamarekin and assigned to the same assignee as the present invention. In this Gamarekin application, a plurality of current supply channels controlled by separate electron discharge devices are selectively energized by a voltage responsive array of switching devices.

When successively spaced electromagnets 26 are energized by the voltage level selection circuit 30 in accord with successive amplitude levels, a plurality of magnetic images are formed on the surface of ferromagnetic cylinder 11, the relative axial positions of the images reflecting the corresponding amplitude levels of the incoming signal. Since ferromagnetic cylinder 11 is rotating, this succession of magnetic images is spread along a time axis represented by the movement of cylinder 11. As a consequence, a series of dots or short lines are transferred to the print receiving material 23*a*, the axial position of the lines indicating the instantaneous amplitude of the incoming signal so that a conventional voltage-time curve is portrayed. It will be appreciated that by increasing the speed of rotation of cylinder 11, a faster time base is produced so that electric signals of very high frequencies in the neighborhood of several thousand cycles per second may be clearing delineated.

In FIG. 3, there is also shown another arrangment for transferring to a print receiving member the magnetic particles adhering to the impressed magnetic image. In this case, the print receiving member is coated with a substance, such as gelatine, which becomes adhesive when wetted. A web 23*a* of this gelatine-coated material is fed through a wetting bath 31 before being passed under the transfer roll 22. After the transfer of the magnetic particles to the wetted adhesive coating, web 23*a* is preferably passed under a drying means such as may be provided by a nozzle 32 which is arranged to circulate warm air around the web. The transferred particles thereupon become "set" and the dry web 23*a* may be rolled and stored without each layer of the resulting rolled web adhering to an adjacent layer.

Referring now to FIG. 4, there is shown a further embodiment of the invention illustrating its use in connection with a high speed facsimile type recording and portraying system. In FIG. 4 the locally magnetizable member comprises an endless ferromagnetic tape 11*a* instead of the ferromagnetic cylinder 11 of FIG. 1. Tape 11*a* is supported and driven by rollers 33, 33*a*, and 33*b*, one of which is driven at a constant speed by a suitable motor 34. A raised helix 35 composed of highly permeable magnetic material carried on a magnetic or nonmagnetic drum 36 is rotated by a high speed motor 37 to have a much higher rate of surface speed than that of tape 11*a*. Helix 35 is arranged with its axis parallel to the surface of magnetic tape 32 and in a position to make continuous contact or to pass in close proximity therewith along an axial line during its rotation. Means are also provided in the facsimile system of FIG. 4 for producing a magnetic field through the magnetic tape 11*a* along the line of contact or magnetic influence of helix 35 with tape 11*a*. One convenient means for producing this magnetic field is shown in FIG. 4 as comprising an electromagnet 38 arranged on the opposite side of magnetic tape 11*a* along a line parallel to the line of contact of helix 35 with tape 11*a*. Electromagnet 38 has an elongated core member 39 of T-shaped cross-section with the base of the T in contact with or in close proximity to the tape 11*a*. Magnetizing coils 40 are wound on the arms of the T, as shown, and connected to be energized in flux opposition through a pair of input conductors 41 and 42. The gap, if any, between helix 35 and tape 11*a* is, of course, much smaller than the space between drum 36 and tape 11 in order that the helix will present a much easier path for magnetic flux emanating from core member 39.

The desired magnetic image is produced by momentarily energizing electromagnet 38 at properly timed intervals relative to the rotational position of helix 35. The circuits for producing these timed energizing pulses may be identical with any of the well-known systems employed for energizing rotating helix type spark recorders such as disclosed in Patent 2,215,806, granted to C. J. Young, September 24, 1940, or Patent 2,434,531 granted to J. A. Wilson, January 13, 1948. In FIG. 4, there is diagrammatically indicated the chief components of one such typical circuit as comprising a voltage-to-time conversion circuit, designated as block 43, synchronized to the rotation of the helix 35 by a synchronizing circuit, designated as block 44. Voltage-to-time conversion circuit 43 functions to produce a voltage pulse whose time of occurrence relative to the time that helix 35 begins to traverse the magnetic tape 11a is dependent upon the amplitude of an incoming signal voltage. This timed voltage pulse output of the voltage-to-time conversion circuit 43 is fed through a suitable pulse amplifier 45 and through conductors 41 and 42 to energize the field producing magnets 40. Where a single curve is to be traced, the signal voltage is sampled once each revolution of helix 35, and a pulse is delivered to the electromagnets 38 at a time during that revolution representing the instantaneous amplitude of the sampled signal. With this mode of operation, the speed of rotation of helix 35 is, of course, much greater than the frequency of variation of the input signal. Where a complete half-tone picture is desired to be transferred to the magnetic tape as a magnetic image thereon, the frequency of variation of the input signal supplied to the voltage-to-time conversion circuit is made much higher than the speed of rotation of helix 35, and this input signal is sampled during each cycle of signal variation such that a complete line of properly spaced magnetic image dots or marks are impressed upon magnetic tape 11a during each revolution of the helix. The spacing of the image marks can be controlled by a modulation of the input signal which, in turn, may be in conformity with a picture which has been scanned by electrical means, such as by television-type scanning. A more detailed description of the chief-components of the above-described pulse energizing circuit of FIG. 4 can be found in U.S. patent application Serial No. 111,538, filed August 20, 1949, now Patent No. 2,596,118, by A. F. Bischoff and K. L. Boring, and assigned to the same assignee as the present invention.

One important feature of the magnetic image producing system of FIG. 4 is the arrangement of the magnetic field producing means on the side of magnetic tape 11a that is opposite the surface desired to be magnetized. As a result of this arrangement, the magnetic lines of force passing from the magnetic field producing electromagnet core 39 to helix 35 tend to converge upon the helix and thus to produce a sharply defined image on the helix contacting surface of tape 11a.

In order to insure that a magnetic image is produced only at the instantaneous point of contact of the helix to tape 11a, the strength of electromagnet 38 with respect to the magnetizability of the tape 11a must be such that little or no magnetization of the tape 11a is produced except at those points where the magnetic circuit is completed through the magnetically permeable helix 35. This can be readily understood by referring again to the magnetization curve of FIG. 10. The magnetizing force produced by electromagnet 38 in the portions of tape 11a not in contact with helix 35 should fall within the low initial permeability region R of the tape and preferably should be just at the magnetization threshold as represented by the lower knee K of the curve. Under these conditions, and especially where drum 36 is composed of non-magnetic material, the influence of the highly permeable helix upon the field of electromagnet 38 produces a concentration of the magnetic lines of force toward the helix and a consequent rise in flux density through tape 11a resulting in magnetization of tape 11a at the helix contacting point.

In FIG. 4 there is also shown alternative apparatus for developing the magnetic image produced on magnetic tape 11a. An endless belt 47 of coarse surface material is arranged to pick up from container 19 comminuted magnetic particles 18, which are preferably in dry powder form, and to carry the magnetic particles 18 alongside the magnetic image containing surface of tape 11a. A rotating agitator 48 shakes the comminuted particles 18 loose from belt 47 and spreads or "dusts" these particles on the surface of tape 11a. Since the dusting is accomplished against the force of gravity, the comminuted particles adhere to the surface of tape 11a only in those portions of the surface thereof which have become magnetized. A clear and clean delineation of the magnetized image is thus produced.

The magnetic image thus developed may be transferred to a print receiving material 23 in the same manner as discussed with reference to FIGS. 1 and 3. However, there is incorporated into the recorder of FIG. 4 apparatus for improving the sharpness and clarity of the image development during the printing process so that the printed portrayal is an accurate and clear reproduction of the magnetic image impressed upon the ferromagnetic tape 11a. Both transfer roller 22a and tape supporting roller 33a opposite to transfer roller 22a are preferably composed of permanently and radially magnetized material to produce a magnetic field between the rollers that extends parallel to a transverse magnetization of tape 11a such as produced by the impressed magnetic image, but is reversely polarized relative thereto. The operation, as well as the desirability of this additional magnetic field superimposed at the point or region of printing, can best be understood by reference to FIGS. 5 and 6.

In FIG. 5, there is shown an enlarged cross-section of tape 11a after it has been locally magnetized by such means as a magnetic field pulse passing from electromagnet core 39 to helix 35, and developed by dusting with comminuted magnetic particles 18. The magnetized region, designated by numeral 17a in effect comprises a small bar magnet extending transversely through the tape and having north and south magnetic poles at the opposite ends thereof. Because of the small length of this magnetized region 17a resulting from the small thickness of tape 11a, the majority of the external pole-seeking magnetic lines of force $f$ emanate from the poles at a considerable angle from the axial line of the bar magnet represented by magnetized region 17a. As a consequence, the comminuted magnetic material 18 adheres to the surface of tape 11a in the form of the outline of the magnetic pole and at an angle aligned with the external lines of force, substantially as indicated in FIG. 5. When this developed image is printed by contact printing means, a slightly fuzzy outline of the magnetic image represented by the surface of the magnetized region 17a results. Where a "dot" magnetic image is impressed on ferromagnetic member 11a, for example, a small circle is printed, and where a "line" magnetic image is impressed, a pair of parallel lines, spaced by an amount substantially equal to the thickness of the "line" magnetic image, are printed. For most practical purposes, this portrayal of the magnetic image outline is just as suitable and intelligible as a complete portrayal of the entire magnetic image area.

However, for those applications where a sharp development of the complete magnetic image area is desired or necessary, the magnetic field producing printing means of FIG. 4 may be used. In FIG. 6, there is shown an enlarged cross-sectional view of the magnetic field producing printing means of FIG. 4 as the magnetic tape 11a magnetized and developed in the manner illustrated in FIG. 5 is passing under the influence of the printing means. Tape supporting roller 33a is radially magnetized to have a predetermined magnetic pole, indicated as north, at its circumferential surface. Transfer roller 22a is also radially magnetized but in an opposite direction so as to have an opposite magnetic pole, indicated as south, at its circumferential surface. A substantially uniform magnetic field, designated by dashed lines of force F, is thus established in the region of transfer of the comminuted magnetic material 18 to the print receiving web 23. This magnetic field F passes through tape 11*a* and must be in a direction that opposes the direction of the formerly occurring external pole-seeking flux *f* of the magnetized regions 17*a* of tape 11*a* illustrated in FIG. 5, and is consequently aligned with the direction of the magnetic lines of force within the magnetized region 17*a* itself. In other words, if the tape 11*a* is magnetized by the magnetic image producing means of the invention so that the magnetized surface region of tape 11*a* that passes adjacent transfer roller represents a north magnetic pole and the opposite magnetized surface region represents a south pole, then the supporting roller 33*a* and the transfer roller 22*a*, must be magnetically polarized north and south respectively, as illustrated in FIG. 6.

However, if the polarity of the magnetized region 17*a* is reversed, then the polarity of supporting roller 33*a* and the transfer roller 23*a* must also be reversed to maintain the same relative magnetic field directions. With the magnetic fields aligned in the manner shown in FIG. 6, the magnetic flux emanating from the image developed surface of region 17*a* passes directly to the opposite pole, represented by the surface of transfer roller 23*a* in substantially the direction of magnetic field F, and the comminuted magnetic particles 18 adhering to the magnetized surface region align themselves in accordance with this flux, as illustrated. As a consequence, the magnetic image adhering comminuted magnetic material 18 is confined only to the surface area of the magnetized region 17*a* of tape 11*a* and there are no fringing effects or fuzzy outline when the magnetic particles are transferred to the print receiving web 23 by contact therewith under the influence of magnetic field F.

Although it is preferred to employ permanently and radially magnetized ferromagnetic material for both the tape supporting roller 33*a* and the transfer roller 22*a*, a substantial improvement in the clarity of the developed magnetic image printing can be achieved by merely utilizing a permanently magnetized transfer roller 22*a* alone. The lines of force emanating from the image developed surface of region 17*a* will still pass directly to the opposite magnetic pole represented by the surface of transfer roller 22*a* with only a slight dispersion with distance. Since the gap between the surface of tape 11*a* and transfer roller 22*a* is extremely small, of the order of the thickness of the print receiving web 23, the comminuted magnetic material 18 adhering to the magnetic image is confined to the immediate surface area of the image in substantially the same manner as described above in connection with the more elaborate magnetic field producing means of FIG. 6.

It will be appreciated that the strength of this magnetic field superimposed on the printing means of the invention must not be so great as to erase or obliterate the magnetized region 17*a* of tape 11. The field necessary to produce the required concentration and "focusing" of the magnetic flux across the printing gap need only have a much smaller magnetizing force as compared, for example, to the force required to magnetize or demagnetize the tape 11*a*.

After the printing step has been accomplished, the tape 11*a* of FIG. 4 may then be demagnetized, if desired, by erasing magnets 49 and 50 located on opposite sides of tape 11*a*, which magnets are much more strongly magnetized than rollers 33*a* and 22*a*. Two magnets 49 and 50 are preferably provided in place of the single erasing magnet 24 of FIGS. 1 and 3 in order to insure complete demagnetization throughout the thickness of tape 11*a*.

Referring now to FIG. 7, there is shown a further embodiment of the invention in the form of a high speed printer suitable for use with modern high speed digital computers. A principal feature of this printer is a high speed magnetic image producing system which may appropriately be termed a high speed "magnetic type-setting" system. A hollow cylinder 51 preferably non-magnetic and carrying a plurality of character plugs 52 outstanding from the circumferential surface thereof along spaced circumferential lines is adapted to be rotated by such means as motor 53 at a relatively high speed such as several thousand revolutions per minute. The character plugs 52, an enlarged view of one of which is shown in FIG. 8, each comprise a highly permeable, low coercivity, and high resistivity magnetic body member which is terminated in a sharp edge or tip 52*a* having the shape of a visually intelligible indicium such as a particular character that is desired to be printed. Character supporting cylinder 51 is arranged alongside a permanently magnetizable member such as ferromagnetic cylinder 11 so that the character-shaped ends of character plugs 52 make tangential contact with, or pass in close enough proximity magnetically to influence, the ferromagnetic cylinder 11 along an axially extending surface line thereof. It should be noted that the indicia on the ends of the character plugs 52 which are arranged in a given axially extending row are alike which the indicia on the ends of the character plugs in each circumferential row are unlike.

Within hollow cylinder 51 are a plurality of electromagnets 54 arranged in a linear array to register respectively with each circumferential line of character plugs 52 as cylinder 51 rotates. By energizing an electromagnet 54 when a character plug 52 carried by cylinder 51 is radially aligned therewith, the magnetic flux produced by the energized electromagnetic 54 is carried through the plug to penetrate and locally magnetize the surface of ferromagnetic cylinder 11 in the form of the particular character involved.

With the magnetic type-setting system of FIG. 7, it is possible to produce a complete axially extending line of locally magnetized images upon the surface of cylinder 11 with each revolution of character supporting cylinder 51. A separate timing circuit 100, more fully described hereinafter, is provided for each electromagnet 54 associated with a respective circumferential line of characters 52. During each revolution of supporting cylinder 51, pulses of current are passed through the energizing coils of the various electromagnets 54, at appropriately selected simultaneous or sequential instants of time during the revolution, and the images impressed upon ferromagnetic member 11 are those of the particular characters which are radially aligned to the electromagnets when these electric pulses occur. In this manner any of the many characters spaced circumferentially around the cylinder 51 that are in any one circumferential line may be selected during any given revolution of the character wheel 51, and a whole axially extending line of character images may be impressed on member 11 during one revolution. Since ferromagnetic cylinder 11 is normally rotated at a much slower speed than character supporting cylinder 51, the character images are transferred to member 11 along substantially the same line during each revolution of character supporting cylinder 51. However, in order to insure proper spacing between each line, it may be desirable to pulse all electromagnets during every other revolution of the cylinder 51.

In FIG. 7, there is shown in block diagram a timing system 100 such as might be used in connection with binary type digital computers. As is well known, such digital computers normally operate in response to a series of electric pulses to produce a predetermined electric condition in a number storing and translating unit that represents a computed number. The number is considered to be "stored" in this particular electric condition of the unit and can later be translated by various means such as by energizing the unit to return to a zero signal condition and by measuring the number of pulses or the length of time necessary to reach this zero signal condition. The electrical circuit used in this number storing and translating unit 101 normally merely comprises a plurality of Eccles-Jordan multivibrators, connected in tandem and each operating alternatively between two steady state conditions in response to consecutive input signal pulses. The various combinations of the steady-state conditions of all the multivibrators represent different numbers, and in a decade unit there are usually four such multivibrators with ten different combination steady state conditions representing the digits 0 through 9. In order to measure or utilize the number represented by any given combination steady-state condition, it is necessary only to supply input signal pulses to the unit until the zero number condition is reattained, at which time the unit functions to produce an output voltage pulse. The number of signal pulses supplied or the length of time required to produce the output voltage pulse represents the complement of the number stored. This complementary number may, of course, be used for almost all electric purposes in the same manner as the stored number itself. Since this type of number storing and translating circuit is well known to those skilled in the digital computer art and does not comprise my invention, there is shown this conventional number storing and translating unit as block 101 in order to prevent an undue complication of the drawings. A more complete and detailed explanation of the construction and operation of such digital computer number storing and translating units can be found in many recent publications. One such explanation together with illustrative circuit diagrams and a complete bibliography can be found in chapters 3 and 4 of a book entitled "High Speed Computing Devices" by the staff of Engineering Research Associates, Inc., published 1950 by McGraw-Hill Book Company.

In order to adapt the apparatus of FIG. 7 to record and portray the numbers stored in a number storing and translating unit 101 of this type, it is necessary only to employ an electromagnet energizing pulsing device 102, and a means for supplying timing and synchronizing signals to the pulsing device 102 and to the number storing and translating unit 101.

The timing signals represent the relative circumferential positions of each axially extending line of characters 52 on cylinder 51 and may be produced by any suitable high speed selective switching means such as by a plurality of spaced magnets 103 substantially aligned with each axially extending line of character plugs 52 and arranged to pass under a magnetic pick-up 104 as cylinder 51 rotates. These timing signals are supplied both to trigger the multivibrators of the number storing and translating unit 101 and to trigger the pulsing device 102. However, both the number storing unit 101 and the pulsing device 102 are normally maintained in a condition insensitive to these timing pulses. The number storing unit 101 is "gated" (i.e., rendered in a condition to be energized by the timing pulse next occurring) by a synchronizing signal whose time of occurrence represents a predetermined reference point on the circumference of cylinder 51. This synchronizing signal is diagrammatically indicated as being produced by a magnet 105, carried on cylinder 51, as it moves past a magnetic signal pick-up means 106.

The pulsing device 102, on the other hand, is "gated" (i.e., is placed in a condition to be energized by the timing pulse next occurring) by the output voltage pulse of the number storing unit 101. Pulsing device 102 may, for example, be any of the well-known types of electronic pulse amplifiers in which a normally inoperative stage thereof is rendered operative by a gating pulse. As explained above, the output voltage pulse of the number storing unit 101 occurs whenever the unit 101 reverts back to its zero number condition; and the length of time required to reach this output pulse producing condition depends, in turn, upon the number of effective timing pulses required to produce this reversion. Since the timing pulses represent consecutively spaced points on the circumference of the cylinder 51 with reference to a point represented by the synchronizing pulse, and the electromagnet 54 is energized in response to one of these timing pulses as determined by the number stored in the storage unit 101, it is a simple matter to arrange the characters 52 on cylinder 51 so that the proper number is radially aligned with the electromagnet when the energizing pulse arrives.

The maximum speed at which such magnetic images can be impressed upon the permanently magnetizable member 11 depends to a large extent upon the magnetic response and recovery time of the electromagnets 54, as well as upon other properties of the magnetic members involved, as will be more fully discussed hereinafter. With the high permeability core materials and the highly and permanently magnetizable materials now generally available, however, sufficient magnetizing force to produce a fairly sharp magnetic image has been obtained with electric energizing pulses of less than 20 microseconds duration.

In the high speed recorder of FIG. 7, there is shown still other apparatus for bringing the comminuted magnetic material 18 under the magnetic attracting influence of the magnetic image containing surface of ferromagnetic member 11 in order to develop the image. In FIG. 7, the comminuted magnetic material 18 is sprayed under pressure against the image containing surface of ferromagnetic member 11. An elongated container 55 is terminated at the top through a narrow throat 56 into a wedge-shaped open mouth 57. A plurality of longitudinally spaced inlet gas conduits 58 extend into container 55 to a point near the bottom of the container. A gas, such as air, is forced under pressure through conduits 58 and forces comminuted magnetic particles 18 within the container up through the throat 56 and into the mouth 57 in the form of an agitated spray. Due to a cleaning action of the gas stream, the comminuted magnetic particles are blown away from the surface of cylinder 11 except in the region of magnetization, and by regulating the gas pressure supplied to container 55 through inlet conduits 58, the comminuted magnetic particles can be sprayed against ferromagnetic cylinder 11 with an optimum force for the sharpest and cleanest development of the magnetic image 17.

Referring now to FIG. 9, there is shown a modification of the high speed recorder of FIG. 7 in which an endless permanently magnetizable tape 11*a* is substituted for the ferromagnetic cylinder 11 of FIG. 7, and a magnetic field producing means comprising a plurality of electromagnets 59 are located upon the opposite side of the magnetic tape 11*a* from character supporting cylinder 51. Each electromagnet 59 is aligned to pass a magnetizing field through tape 11*a* to a different circumferential line of character plugs 52. With this arrangement, the construction of the character supporting cylinder 51 is simplified to a considerable extent since it need not be hollow, and there is a greater ease of access to the electromagnets 59 than to the internal pulsing electromagnets 54 of FIG. 7.

In FIG. 9, there is also shown a further method and apparatus for accomplishing the actual transfer of the magnetic particles 18 to a print receiving member, which method eliminates the necessity of using any type of coating upon the print receiving member with the result that a simple sheet of untreated paper 23*b* may be used. The transfer is accomplished in this case by employing a colored liquid such as a printing ink in conjunction with the comminuted magnetic material to provide a magnetically sensitive ink 18*a*. The magnetic ink 18*a* may comprise, for example, pulverized iron filings or iron oxide powder suspended within any of the well known printers' ink solutions. In this embodiment of the invention, the magnetic image containing tape 11*a* passes in close proximity to the surface of the mixture of printing ink and comminuted magnetic material, and the magnetic material is attracted to the image and carries with it some of the ink solution. In order to accomplish the actual transfer of the magnetic ink to the interposed sheet of paper 23*b*, a simple contact printing system may be used, although it is preferred to employ a magnetic-field producing printing means similar to that described in connection with FIG. 4. Either transfer roller 22*a* alone, or both transfer roller 22*a* and tape supporting roller 33*a* may be radially magnetized to produce the magnetic field. The degree of magnetization of these magnetic field producing rollers, however, is much greater than that employed in the systems illustrated in conjunction with FIG. 4. The resulting magnetic field must be of sufficient intensity to have an attractive force upon the magnetic particles that is stronger than that of the magnetic image. The image adhering magnetic particles are then transferred together with the ink carried thereby to the interposed sheet of paper. The transfer of a magnetically sensitive ink to a print receiving material under the influence of a magnetic field is already known in the art and various types of magnetically sensitive inks have now become available.

Although the intensity of the magnetic image may be somewhat reduced by such magnetic field induced transfer, this appears to have no appreciable effect upon the clarity of a single printing. It will be appreciated, however, that a magnetic ink printing system normally will not be used where the same image is to be employed for many printings, such as when many reproductions of a single magnetic image are desired.

For optimum performance, it has been found that the various components of the invention should be constructed from materials having certain desired magnetic properties. When an electromagnet is employed for the magnetic field producing member, a low loss, high resistivity, and high initial permeability core material such as ferrite should be used. A core material comprising an alloy of nickel, iron and molybdenum known as "Monimax" has also been found to be suitable. With such high resistivity, high permeability material, a concentrated magnetic field can quickly be achieved at the core tip in response to an electric current through the coil of the electromagnet. For some purposes, such as in the apparatus of FIGS. 3, 4, 5, 7 and 9 where the recordation is to be discontinuous, such as in the form of dots or dashed lines, or where the recordation is to be accomplished at high speed, the core material should also have low coercivity so as to have little magnetic retentivity. A rapid build-up and collapse of the magnetic field in accord with an electrical pulse signal can thereby be achieved. If character plugs such as illustrated in connection with the high speed apparatus of FIGS. 7 and 9 are employed to direct the magnetic field into a desired field configuration, the magnetic properties of these character plugs should be the same as that described above in connection with the core material employed in the electromagnets.

The locally magnetizable member, such as the ferromagnetic cylinder 11 or the magnetic tape 11*a*, should have high coercivity in a direction through the thickness of tape so as to have high residual magnetism. It has also been found that the locally magnetizable member should preferably be fairly thin such as about .005" in thickness in order to reduce the image-spreading effects of eddy currents and thus to enable a sharply defined magnetic image to be produced. Where the locally magnetizable member is supported in a rigid state such as in the form of a cylinder, any of many well known "permanently" and radially magnetizable materials such as types of Alnico may be employed. Where the locally magnetizable member must be durable and flexible such as when used as a thin tape, an alloy of copper, nickel and iron known as "cunife" has been found to be admirably suited for the purpose.

It will thus be seen that there is provided a method and apparatus for recording and portraying information which is adaptable to the fulfillment of many different recording and portraying functions. The magnetic image can be produced at an extremely high rate of speed so that the invention is easily adapted to high speed recording apparatus. With the modern highly permeable magnetic materials now generally available, a well-defined magnetic image of any information such as is normally portrayable by conventional ink type apparatus can also be portrayed by the magnetic apparatus of the invention. As described above, the invention is adaptable to both a dry powder developing process as well as a liquid developing process. The actual printing may be effected upon specially sized print receiving members or upon untreated members in conjunction with available magnetic inks or adhesively coated magnetic particles. Moreover, the electric timing circuits which may be employed in the invention are used conventionally with various types of spark recorders and few, if any, special circuits are required in order to utilize the apparatus of the invention for numerous practical applications.

Although there is shown particular embodiments of the invention, many modifications may be made, and the appended claims are intended to cover all such modifications as fall within the true spirit and scope of the invention.

What is claimed is:

1. A magnetic image recording and portraying system comprising, a ferromagnetic member of high magnetic retentivity, a plurality of electromagnets, each having a core member with a tip having the configuration of an individual discrete whole character, each core member being arranged with the tip thereof in magnetizing relation with a region of said ferromagnetic member, means for moving said ferromagnetic member relative to said core tips, means for selectively energizing said electromagnets to selectively impress magnetic images on said regions, and developing means including comminuted magnetic material arranged to be within the magnetic attracting influence of the magnetic images impressed on said regions as the ferromagnetic member is moved relative to said core tips.

2. An information recording apparatus comprising, a permanently magnetizable medium supported for movement along a predetermined path, a magnetically permeable member having a predetermined configuration in proximity with a region on one side of said medium, an electromagnet having a core member aligned to said permeable member on the opposite side of said medium whereby a magnetic image of the configuration of said magnetically permeable member is impressed upon the magnetizable medium when said electromagnet is energized, means for energizing said electromagnet, commiunted magnetic material arranged to be within the magnetic attracting influence of the image containing surface of said magnetizable medium as it moves along said path, and printing means for transferring said comminuted magnetic material attracted to said magnetizable medium to a permanent record medium.

3. An information recording and portraying apparatus comprising, a ferromagnetic member capable of localized surface magnetization, a plurality of electromagnets each having a magnetic core member with a portion thereof shaped to have the configuration of a discrete whole character and arranged to direct a magnetic field into said ferromagnetic member to magnetize locally said ferromagnetic member in the configuration of said discrete whole character when said electromagnet is energized, means for selectively energizing said electromagnets, means for moving said ferromagnetic member along a predetermined path, and minute magnetic particles positioned adjacent the path of movement of said ferromagnetic member a predetermined distance from said electromagnets and arranged to come under the magnetic attracting influence of the locally magnetized regions of said ferromagnetic member as it moves along said path.

4. A recording and portraying apparatus comprising, a magnetically permeable drum, a ferromagnetic locally magnetizable cylinder covering the circumferential surface of said drum, means for continually and cyclically rotating said drum, a plurality of spaced apart electromagnets each having an end portion of a magnetic core thereof in magnetizing relation with the surface of said cylinder, said core end portions having predetermined spatial configurations forming visually intelligible indicia-means for selectively energizing said electromagnets to magnetize discrete regions of said cylinder locally in the configurations of said magnetic core end portions, and comminuted magnetic particles located to be magnetically attracted into contact with the locally magnetized regions of said cylinder as it rotates.

5. A magnetic image recording apparatus comprising, a locally magnetizable member supported for movement along a predetermined path, a plurality of magnetically permeable members of predetermined tip configuration supported in the form of a circle in substantially tangential relation with said locally magnetizable member, means for rotating said circle of permeable members at high speed, an electromagnet arranged to be in magnetic circuit with said locally magnetizable member and successive ones of said magnetically permeable members during their rotation, and means timed in accord with the rotation of said permeable members for momentarily energizing said electromagnet with spaced electric pulses occurring when said electromagnet is in magnetic circuit with selected ones of said magnetically permeable members.

6. A magnetic image recording system comprising, a permanently magnetizable medium supported for movement along a predetermined path, a cylinder, means for rotating said cylinder at a substantially constant speed, a plurality of magnetically permeable character plugs arranged around the circumference of said cylinder, said cylinder being located to bring each said plug in proximity with a region of one side of said medium during the rotation of said cylinder, an electromagnet having a core member aligned to the region of proximity of said permeable character plugs whereby said medium is magnetized in the configuration of the character plug in proximity with said region when said electromagnet is energized, and means for momentarily energizing said electromagnet at predetermined intervals corresponding to the time of proximity of selected ones of said character plugs with said region 7. A high speed recording and portraying apparatus comprising, a locally magnetizable ferromagnetic tape, a rotatable drum with magnetically permeable character plugs spaced around the circumferential surface of said drum, means for moving said tape past said drum in close proximity with said plugs as said drum is rotated, an electromagnet on the side of said tape opposite to that of said drum, said electromagnet having a core member aligned to the region of close proximity of said permeable character plugs with said ferromagnetic tape, means for momentarily energizing said electromagnet to produce a magnetic image of one of said permeable character plugs upon said tape, and image developing means including minute magnetic particles and means for moving said ferromagnetic tape into magnetic attracting relation with said minute magnetic particles after said magnetic image is impressed thereon.

8. A high speed magnetic image recording and portraying system comprising, a ferromagnetic tape having high coercivity, a magnetically permeable helix supported for rotation in continuous tangential contact with a line on said tape, an electromagnet located on the opposite side of said tape from said helix, said electromagnet having a core member in magnetizing relation with said tape along said helix contacting line, means for momentarily energizing said electromagnet to magnetize said tape only at the helix contacting point on said line subsisting at the instance of electromagnet energization, and comminuted magnetic material arranged to be within the magnetic attracting influence of the magnetized surface of said magnetic tape.

9. Information recording and portraying apparatus comprising, a permanently magnetizable tape supported for movement along a predetermined path, a magnetically permeable helix supported for rotation in tangential proximity with a line on one side of said tape, an electromagnet having a core member aligned to said line on the opposite side of said tape whereby magnetization of said tape occurs only at the helix contacting point subsisting when said electromagnet is energized, means for energizing said electromagnet, and comminuted magnetic material arranged to be within the magnetic attracting influence of the magnetized point of said tape as it moves along said path.

10. An apparatus as recited in claim 9 further comprising, a printing means for transferring said comminuted magnetic material attracted to said tape to a permanent record medium.

11. A high speed recording system comprising, a record medium supported for movement along a predetermined path, a cylinder, means for rotating said cylinder, a plurality of character image members arranged around the circumference of said cylinder, said cylinder being located to bring each of said members in proximity with a region of one side of said medium during the rotation of said cylinder, selectively operable electromagnetic energy means aligned to the region of proximity of said members on the opposite side of said medium whereby images are recorded on said medium in the configuration of members aligned to said electromagnetic energy means when selectively energized, and means for selectively energizing said electromagnetic energy means.

12. In a high speed recording system as described in claim 11 wherein said means for selectively energizing said electromagnetic energy means comprises a first means for storing and translating electrical signals representative of a selected image to be recorded on a given region of said medium, a second means for producing signals which represent the image member proximate to said region at any given time, and a gated pulsing means responsive to said first means and said second means for energizing said electromagnetic energy means when the image member on said cylinder selected to be recorded is proximate said given region of said medium.

13. A recording system adapted to record lines of character images on a medium comprising: a rotatable cylinder; a plurality of members arranged around the circumference of said cylinder to form a number of rows parallel to the axis of said cylinder and a number of rings perpendicular to said axis, each member of a given row having a portion in the configuration of a given character image and the members of a given ring having respective portions in the configuration of different character images; means for rotating said cylinder upon its axis; means for moving said medium relative to said cylinder to cause successive regions of said medium to be tangentially proximate to said cylinder; a plurality of selectively energizable electromagnetic means, each associated with a different ring of members and each being adapted to provide on a region of said medium an image of the configuration of the character image member in its associated ring which is proximate said region of said medium when said electromagnetic means is energized; and means for selectively energizing said plurality of electromagnetic means.

14. In a recording system as described in claim 13 wherein said means for selectively energizing said plurality of electromagnetic means comprises a circuit for each electromagnetic means associated with a corresponding ring of character image members and including: a first means for storing and translating electrical signals representative of a selected character image to be recorded on a given region of said medium; a second means for producing signals which represent the row of character image members proximate to said medium at any given time; and a gated pulsing means responsive to said first means and said second means for energizing said electromagnetic means associated with said corresponding ring of character image members when the character image member thereon selected to be recorded is proximate said given region of said medium.

15. In a high speed apparatus for recording character images on a record medium, the combination comprising: a rotatable cylinder having a plurality of like character image rings, each ring containing a plurality of raised electromagnetic field transmitting members arranged around the circumference of said cylinder, each member having a distinct character image configuration and the respective members of a given ring having different image configurations; means for rotating said cylinder upon its axis; means for tangentially moving a record medium relative to said cylinder to cause successive regions of said medium to be tangentially proximate to said cylinder; a plurality of selectively energizable sources of electromagnetic fields located on a line parallel to the axis of said cylinder, each source being positioned proximate a corresponding one of said rings; and means for selectively energizing said sources whereby electromagnetic field images are transmitted through selected transmitting members and said record medium.

16. In a high speed apparatus for recording character images on a record medium as described in claim 15 wherein said means for selectively energizing said sources of electromagnetic fields comprises: a circuit for each source of electromagnetic fields associated with a corresponding one of said rings and including: a first means for storing and translating electrical signals representative of a selected character image to be recorded on a given region of said medium; a second means for producing signals which represent the character image member proximate to said medium at any given time; and a gated pulsing means responsive to said first means and said second means for energizing said source of electromagnetic fields associated with said corresponding one of said rings when the character image member thereon selected to be recorded is proximate said given region of said medium.

17. In a system for recording images on a medium responsive to electromagnetic energy and adapted to retain localized images of the electromagnetic energy received thereon, the combination comprising: a cylinder having a plurality of like character image rings, each ring having a plurality of electromagnetic energy transmitting members and each member of a given ring having a distinct image configuration; means for rotating said cylinder relative to said medium whereby a selected member of said rings on said cylinder may be positioned proximate a region of said medium; a plurality of selectively energizable sources of electromagnetic energy each so positioned in relation with a character image ring and said cylinder as to be proximate a given member of a character image ring on said cylinder while said given member is proximate said region of said medium, and means for selectively energizing said sources of electromagnetic energy whereby electromagnetic energy is transmitted through selected members proximate said medium to a region of said medium.

18. In a system for recording images on a medium responsive to electromagnetic energy and adapted to retain localized images of the electromagnetic energy received thereon as described in claim 17 wherein said means for selectively energizing said sources of electromagnetic energy comprises a circuit for each source of electromagnetic energy associated with a corresponding one of said rings and including: a first means for storing and translating electrical signals representative of a selected character image to be recorded on a given region of said medium; a second means for producing signals which represent the character image member proximate to said medium at any given time; and a gated pulsing means responsive to said first means and said second means for energizing said source of electromagnetic energy associated with said corresponding one of said rings when the character image member thereon selected to be recorded is proximate said given region of said medium.

19. In a system for recording character images on a medium, the combination comprising: a rotatable cylinder; means for rotating said cylinder upon its axis; a plurality of character image members arranged around the circumference of said cylinder to form a number of rows parallel to said axis and a number of rings perpendicular to said axis, each member of a given row having an end portion in the configuration of a given character image and each of a group of members of a given ring having an end portion in the configuration of a different character image; means for moving said medium relative to said cylinder to cause successive regions of said medium to be tangentially proximate to said cylinder; a plurality of selectively energizable electromagnets, each one associated with a different ring of members and each being adapted to project on a region of said medium an image of the configuration of a discrete character image of a member in its associated ring which is proximate said region of said medium when said electromagnet is energized, and means for selectively energizing said electromagnets.

20. In a system as described in claim 19 wherein said means for selectively energizing said electromagnets comprises a circuit for each electromagnet associated with a corresponding one of said rings and including: a first means for storing and translating electrical signals representative of a selected character image to be recorded on a given region of said medium; a second means for producing signals which represent the character image member proximate to said medium at any given time; and a gated pulsing means responsive to said first means and said second means for energizing said electromagnet associated with said corresponding one of said rings when the character image member thereon selected to be recorded is proximate said given region of said medium.

21. A high speed recording and portraying apparatus comprising: a locally magnetizable ferromagnetic member; a rotatable cylinder with magnetically permeable character image members, said character image members being arranged around the circumferential surface of said cylinder in rows parallel to the axis of rotation of said cylinder and in circles perpendicular to said rows; means for moving said ferromagnetic member past said cylinder in close proximity with said character image members as said cylinder is rotated; a plurality of electromagnets, each located to be in successive magnetic circuit relation with said magnetically permeable character image members arranged in a different one of said circles and with a region of said ferromagnetic member proximate said cylinder; means for selectively energizing each of said electromagnets to produce magnetic images of selected character image members on said region; and image developing means including comminuted magnetic particles and means for moving said ferromagnetic member into magnetic attracting relation with said image developing means after said magnetic images are impressed thereon.

22. A high speed magnetic image recording system comprising: a locally magnetizable ferromagnetic member supported for movement along a predetermined path; a rotatable cylinder; means for rotating said cylinder; a plurality of magnetically permeable character image members arranged around the circumference of said cylinder, said rotatable cylinder being located to bring each of said image members in proximity with a region of one side of said ferromagnetic member while being rotated; a selectively energizable electromagnet having a core member aligned to the region of proximity of said permeable character image members on the opposite side of said ferromagnetic member whereby said ferromagnetic member is magnetized in the configuration of the character image member aligned to said electromagnet when said electromagnet is energized; means for selectively energizing said electromagnet; developing means including comminuted magnetic particles arranged to be attracted to said ferromagnetic member by magnetic configurations thereon; printing means for transferring said comminuted magnetic particles attracted to said ferromganetic member to a print receiving medium; and demagnetizing means for erasing said magnetic configurations on said ferromagnetic member after the development and printing thereof.

23. In a printing apparatus, the combination of a rotatable cylinder having a plurality of circumferential rows of magnetizable indicia about its surface, the indicia of all the rows being in alignment longitudinally of said cylinder, the indicia in each circumferential row being different and those in each longitudinal row being alike, each indicia being shaped to produce a magnetic field external of the cylinder shaped in the form of the respective indicia when magnetized, means to pass a medium of material of high magnetic retentivity substantially tangentially of said cylinder, whereby any indicia adjacent said medium when magnetized produces a magnetic impression in said medium having the shape of the respective indicia, means to rotate said cylinder during movement of said medium tangentially past the cylinder, and means to magnetize said indicia in such order and time relation to said medium that said magnetic impressions are impressed in said medium in successive parallel lines to carry intelligence to be printed, and means to convert said magnetic impressions into visible printed characters in corresponding parallel lines on a printed medium.

24. In a printing apparatus, the combination of a rotatable cylinder having about its surface a plurality of circumferential rows of magnetizable indicia, the indicia of all the rows being in alignment longitudinally of said cylinder, the indicia in each circumferential row being different and those in each longitudinal row being alike, each indicia being shaped to produce a magnetic field external of the cylinder shaped in the form of the respective indicia when magnetized, means to pass material of high magnetic retentivity substantially tangentially of said cylinder, whereby any indicia adjacent said material when magnetized produces a magnetic impression in said material having the shape of the respective indicia, means to rotate said cylinder during movement of said material past the cylinder to bring all of the different indicia adjacent said material, and means selectively to magnetize different of said indicia when adjacent said material during each rotation in accord with intelligence to be printed to produce a line of magnetic impressions in said material, one line for each rotation of said cylinder, said lines bearing said intelligence, and means to transcribe said magnetic impressions into printed characters on a printed medium.

25. An information recording apparatus comprising a magnetizable recording medium supported for movement along a path, a magnetically permeable field-shaping member having a surface configuration corresponding to a discrete visually intelligible indicium in proximity with a surface of said recording medium, means aligned with said member for momentarily establishing a magnetic field through said member and into said recording medium, said member shaping said field in the configuration of its surface and said shaped field magnetizing said medium in the image of said configuration, comminuted magnetic material arranged to be within the magnetic attracting influence of said medium as it moves along its path, and printing means for transferring said material attracted to said medium to a record member.

26. A magnetic image recording system comprising a magnetic recording medium, means for producing a shaped magnetic field having the spatial configuration of a predetermined visually intelligible indicium, means for supporting said recording medium in proximity with said magnetic field producing means to be within the effective range of influence of its shaped magnetic field, means for moving said recording medium in said supported position relative to said magnetic field producing means, means generating pulse signals upon the occurrence of discrete relative positions between said medium and said magnetic field producing means, and means supplying said pulse signals to said field producing means to magnetize said medium with an internal magnetic image in the configuration of said indicium upon the occurrence of a signal.

27. A magnetic image recording system comprising a magnetic recording medium, means including a rotatable member carrying a field directing element for producing a magnetic field having the spatial configuration of a predetermined indicium, means for supporting said recording medium in proximity with said rotatable member to be within the range of influence of the magnetic field produced by said field directing element, means for cyclically rotating said rotatable member, means generating a pulse signal upon the cyclical occurrence of a discrete position of said element during rotation of said member, means responsive to said pulse signals for controlling said field directing element to magnetize said medium with an internal magnetic image in the configuration of said indicium upon the occurrence of a signal, and means for moving said supported recording medium relative to said rotatable member.

28. A recording system adapted to record lines of character images at high speed on a medium comprising: a rotatable cylinder; a plurality of members arranged around the circumference of said cylinder to form a number of rows parallel to the axis of said cylinder and a number of rings perpendicular to said axis, each member of a given row having a portion in the configuration of a given character image and the members of a given ring having respective portions in the configuration of different character images; means for rotating said cylinder at a high substantially constant speed upon its axis; means for moving said medium relative to said cylinder to cause successive regions of said medium to be tangentially proximate to said cylinder; a plurality of selectively energizable field producing means, each associated with a different ring of members and each being adapted to provide on a region of said medium an image of the configuration of a character image member in its associated ring which is proximate said region of said medium when said field producing means is energized; and means for selectively energizing said plurality of field producing means.

References Cited by the Examiner

UNITED STATES PATENTS

| | | | |
|---|---|---|---|
| 2,236,373 | 3/41 | Kowalski | 101 |
| 2,359,617 | 10/44 | Bryce | 101 |
| 2,511,121 | 6/50 | Murphy | 101 |
| 2,561,476 | 7/51 | Lang | 101 |
| 2,614,169 | 10/52 | Cohen et al. | 346—74 |
| 2,657,932 | 11/53 | Blaney | 101 |

FOREIGN PATENTS

| | | |
|---|---|---|
| 324,099 | 1/30 | Great Britain. |

OTHER REFERENCES

Jones: Printing by Magnetism. Pub. 1839 in Mechanics Magazine, vol. 31, No. 385, p. 342.

WILLIAM B. PENN, *Primary Examiner,*

ROBERT LEIGHEY, DAVID KLEIN, *Examiners.*

UNITED STATES PATENT OFFICE
CERTIFICATE OF CORRECTION

Patent No. 3,161,544 December 15, 1964

Theodore M. Berry, deceased, by
Albert L. Berry, administrator

It is hereby certified that error appears in the above numbered patent requiring correction and that the said Letters Patent should read as corrected below.

Column 2, line 40, for "particularly" read -- particularity --; column 5, line 53, for "exially" read -- axially --; column 6, line 23, for "clearing" read -- clearly --; column 10, line 25, for "which the indicia" read -- while the indicia --; line 33, for "electromagnetic" read -- electromagnet --; column 14, lines 52 and 53, for "commiunted" read -- comminuted --.

Signed and sealed this 29th day of June 1965.

(SEAL)
Attest:

ERNEST W. SWIDER
Attesting Officer

EDWARD J. BRENNER
Commissioner of Patents